No. 754,824.

Patented March 15, 1904.

UNITED STATES PATENT OFFICE.

HOWARD SPENCE, OF MANCHESTER, ENGLAND.

PROCESS OF MAKING SULFATE OF ALUMINIUM.

SPECIFICATION forming part of Letters Patent No. 754,824, dated March 15, 1904.

Application filed April 20, 1903. Serial No. 153,374. (No specimens.)

*To all whom it may concern:*

Be it known that I, HOWARD SPENCE, a subject of the King of Great Britain and Ireland, residing at Manchester, in the county of Lancaster, England, have invented new and useful Improvements in the Process of Making Aluminium Sulfate, of which the following is a specification.

An important desideratum for various industrial purposes is a sulfate of alumina which shall contain materially less sulfuric acid than that required by the formula $Al_2O_3.3SO_3$.

By my present invention I am enabled not only to produce a soluble crystallized sulfate of alumina which contains only two molecules of $SO_3$ for each molecule of $Al_2O_3$, but also to effect at the same time a very high degree of purification, thus allowing of the employment of low-grade materials for the manufacture of a high-grade product.

In the specification of the French Brevet d'Invention No. 132,204, dated August 12, 1879, Marguerite claims the manufacture of sulfate of alumina having the formula

$Al_2O_3.2SO_3$ by the following process: Ammonia alum is carefully heated in retorts to drive off the water, the sulfate of ammonia, and a little of the sulfuric acid. The calcined residue is treated with a little water, whereby heat is evolved. The resulting pasty mass submitted to a slow evaporation at the ordinary temperature is in part spontaneously and "little by little" changed to the crystallized basic sulfate, which is separated from the remaining pasty sulfates by washing with cold water. Partial desulfatization is also claimed of ordinary or neutral sulfate of alumina either by heat alone or assisted by the presence of chemical agents—such as lime, baryta, alumina, oxid of zinc, iron, or their carbonates or other compounds—either by these agents in the cold or by all other means capable of yielding the product which he proposed to patent. No working directions or data are given for the preparation of basic sulfate except in the case of the process for decomposing ammonia alum by heat.

The following later description by Marguerite of the compound and its preparation in the wet way (*Comptes Rendus* 90, page 1354) clearly indicates success only by methods applicable for scientific purposes: "It is also possible to obtain the sesquibasic sulfate in the wet way. Two methods offer themselves for this purpose: first, by separating a portion of the acid by engaging it in other combinations; second, by eliminating a certain quantity and adding alumina. By the first method of reduction which succeeds best is the treatment with zinc; but in this way only small quantities of the sesquibasic sulfate are obtained. The second method requires excessive additions, but with care it admits of obtaining the sulfate in question."

Pickering (*Chemical News* 45, page 133, A. D. 1882) controverts Marguerite's statement as to the existence of the basic sulfate of alumina. This indicates that the compound had not then (as it has not since) been commercially produced.

It is well known that alumina as existing in its commonly-available sources, such as bauxite and commercial—*i. e.*, crystalline hydrate of alumina—is not soluble under ordinary circumstances or conditions to any considerable extent in solutions of neutral or basic sulfate of alumina without excessive loss both of $Al_2O_3$ and $SO_3$ in an insoluble form. For this reason the sulfates of alumina of commerce rarely contain more than about three or four per cent. of their total alumina in the basic condition—that is to say, in excess of the alumina theoretically required to combine as neutral sulfate with the available sulfuric acid present—unless such basicity has been produced by the addition of soda, magnesia, or other soluble base.

The gelatinous form of hydrate of alumina prepared from soluble salts of alumina by the action of alkali, although soluble in neutral sulfate of alumina, is not, on account of its high cost of production, available as a commercial source of alumina, and therefore need not be taken into consideration.

Now we have found that if alumina in ordinary sources be subjected in excess proportion over that theoretically required to form neutral sulfate to the action of hot sulfuric acid under pressure, as is described in the specification of Letters Patent of the United States granted to Lennig, No. 191,160, of A. D. 1876, for the production of neutral sulfate of alumina a very high proportion of such alumina may be rendered soluble as basic sulfate. In this way when employing bauxite from ten to twelve per cent. basicity can be readily obtained. A still higher degree of basicity can be obtained by employing a still larger excess of the aluminous material; but the loss is greater the greater the excess of material employed. The solutions we thus obtain do not, however, allow of an advantageous production of the crystallized basic sulfate in respect of the percentage yield obtained therefrom. If, however, it is desired for any special reason to obtain a small percentage only of the total alumina in the form of the crystallized basic sulfate—as, for example, in cases where it may be necessary to remove in the mother-liquor a large amount of soluble impurity—these solutions (freed from any insoluble matter they contain) may, as hereinafter described, be crystallized to effect the separation therefrom of the crystallized basic sulfate. Thus a basicity as low as thirteen per cent. is equal to a ratio of basic to ordinary sulfate of about

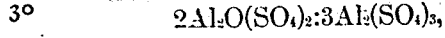

$$2Al_2O(SO_4)_2 : 3Al_2(SO_4)_3,$$

and consequently a proportionally low-percentage yield of the former on the total amount of alumina employed would result.

Separation of the basic and ordinary sulfate by crystallization is not very readily effected when the basicity is lower than the above ratio.

For the most economical and practical production of the basic sulfate it is desirable to have a basicity of about twenty-two to twenty-eight per cent.

We have found that by the addition to the above-named solutions—that is, those solutions which have been rendered as highly basic as practicable consistent with the economical utilization of material—of a sufficiency of finely-divided lime, most advantageously in the form of carbonate, the desired basicity is readily and practically obtained. A still higher percentage of basicity is readily obtained, if desired.

The carbonate of lime, advantageously in the form of a cream, is best added to the warm or hot solution of partially-basic sulfate of alumina having a specific gravity of about 1.35 to 1.40, with agitation during the addition. The resulting solution can then be readily separated from the suspended insoluble matter by means of a filter-press or otherwise. Since a considerable proportion of the necessary basicity is obtained by the previous solution of an excess proportion of $Al_2O_3$, a very much smaller addition of carbonate of lime is necessary than would otherwise be the case, and the amount of precipitated calcium sulfate is consequently less. If the whole of the desired basicity were to be produced by the addition of lime, the quantity of insoluble matter would be highly disadvantageous.

We have found that a hot and strong solution of basic sulfate of alumina in prolonged contact with precipitated calcium sulfate shows a tendency to decompose and precipitate alumina in an insoluble form. Consequently the basic liquor should be separated as rapidly as practicable from the suspended insoluble matter.

The clear solution is now concentrated, most advantageously in vacuum vessels, to a specific gravity of about 1.45 when tested at about 70° centigrade and thereafter cooled to effect the separation of the crystallized basic sulfate of alumina. Basic sulfate crystallizes out readily from the liquor, the neutral sulfate remaining in solution as mother-liquor. The first formation of the crystals is assisted by the addition during cooling of a small amount of crystals from a previous operation.

The unaltered neutral sulfate of alumina present has a marked precipitating effect on the basic sulfate, and for this reason, as well as for the purpose of supplying a medium for the removal of impurities, it is advisable not to bring the percentage of the basic alumina too near to the theoretical thirty-three per cent. Agitation of the liquid during cooling also acts beneficially in accelerating the formation of the crystals. When the "brei" formed is sufficiently cooled, the crystals are separated by known means from the mother-liquor. The mother-liquor containing ordinary sulfate of alumina, together with some basic sulfate of alumina, may be treated by known means for the recovery and utilization of the valuable ingredients it contains.

If the sulfate of alumina employed contains any considerable proportion of ferric sulfate, it is advantageous to reduce it to ferrous sulfate, as thereby the quality of the basic sulfate is improved. This reduction may conveniently be effected by the addition to the liquor previous to filtration of a small proportion of calcium sulfid in the form of alkali waste, which, moreover, aids in rendering the solution basic and also assists in the purification of the product by its precipitation of sulfid of arsenic if arsenical sulfuric acid has been employed.

The crystallized basic sulfate of alumina produced as hereinbefore described is in a highly-suitable form for employment in various industries and for the preparation of other compounds of alumina. It is easily soluble in water and may be readily dried, so as to obtain it with a very high percentage of alumina.

The following is a practical example of the process, giving the required details of time, temperature, &c.:

Example: 41 (forty-one) hundredweights of bauxite containing sixty-five per cent. $Al_2O_3$ were rapidly mixed with 111¾ hundredweights (one hundred and eleven and three-quarter hundredweights) of sulfuric acid at a specific gravity of 1.475 at 35° centigrade and the mixture run into a lead-lined autoclave. Steam was then blown in until the pressure rose to twenty pounds per square inch, after which the heat of combination was sufficient to complete the reaction, and steam was shut off. The pressure rose rapidly, reaching a maximum of seventy-eight pounds per square inch about ten minutes after the steam was shut off. From this maximum the pressure fell gradually to, within about two hours, forty pounds per square inch. The charge, which has a basicity of 10.2 per cent., was then blown out of the autoclave into a lead-lined tank, was diluted to a specific gravity of about 1.39 at 90° centigrade, and was treated with 12¼ hundredweights (twelve and a quarter hundredweights) of finely-divided calcium carbonate mixed with water to a creamy consistency, the temperature being maintained at about 80° to 90° centigrade, and the mixture agitated. The insoluble matter was then separated and washed in a filter-press. The filtrate of 26.5 per cent. basicity and 1.315 specific gravity at 35° centigrade was then evaporated under vacuum to a specific gravity of 1.45 at 70° centigrade and was subsequently cooled with agitation. At a temperature of 22° centigrade about 80 per cent. of the basic sulfate of alumina present crystallized out, the brei of crystals and mother-liquor being subsequently separated in a centrifugal machine.

Having described my invention, what I desire to claim is—

1. The process for the manufacture of crystallized sulfate of alumina containing two molecules of $SO_3$ for each molecule of $Al_2O_3$ which consists in subjecting alumina in excess to the action of hot sulfuric acid under pressure so as to obtain a solution of sulfate of alumina containing an excess of alumina, treating this solution with available lime suspended in water until the desired basicity is obtained, filtering the resulting mixture, evaporating the filtered solution and separating the crystallized basic sulfate therefrom, substantially as described.

2. In the manufacture of crystallized basic sulfate of alumina, the process which consists in subjecting alumina in excess to the action of hot sulfuric acid under pressure so as to obtain a solution of sulfate of alumina containing an excess of alumina, substantially as described.

3. In the manufacture of crystallized basic sulfate of alumina, the process which consists in treating a solution of sulfate of alumina containing an excess of alumina with available lime suspended in water until the desired basicity is obtained, filtering the resulting mixture, evaporating the filtered solution and separating the crystallized basic sulfate therefrom, substantially as described.

4. In the manufacture of crystallized basic sulfate of alumina, the process which consists in treating a solution of sulfate of alumina containing an excess of alumina, with available lime suspended in water until the desired basicity is obtained and filtering off the resulting solution from the insoluble matters, substantially as described.

In testimony whereof I have signed my name to this specification in the presence of two subscribing witnesses.

HOWARD SPENCE.

Witnesses:
WILLIAM GEO. HEYS,
ERNALD SIMPSON MOSELEY.